United States Patent
Ackerman

(10) Patent No.: US 8,056,431 B2
(45) Date of Patent: Nov. 15, 2011

(54) SELF-LOCKING GEAR

(76) Inventor: Stanley Ackerman, Hendersonville, NC (US)

( * ) Notice: Subject to any disclaimer, the term of this patent is extended or adjusted under 35 U.S.C. 154(b) by 492 days.

(21) Appl. No.: 12/206,413

(22) Filed: Sep. 8, 2008

(65) Prior Publication Data

US 2010/0058884 A1    Mar. 11, 2010

(51) Int. Cl.
*F16H 57/10* (2006.01)
(52) U.S. Cl. ...................................... 74/411.5
(58) Field of Classification Search .............. 74/380, 74/411.5; 192/215, 218, 219.2, 220, 223
See application file for complete search history.

(56) References Cited

U.S. PATENT DOCUMENTS

| | | | |
|---|---|---|---|
| 2,892,328 A | 6/1959 | Templeton |
| 3,438,221 A | 4/1969 | Paulsen |
| 3,730,483 A | 5/1973 | Newell |
| 4,088,306 A | 5/1978 | Falkner |
| 4,161,126 A | 7/1979 | Winzeler |
| 4,426,064 A | 1/1984 | Healy |
| 4,595,173 A | 6/1986 | Anderson |
| 5,180,295 A | 1/1993 | Swain et al. |
| 5,226,852 A | 7/1993 | Asaba et al. |
| 5,249,992 A | 10/1993 | Schneider |
| 5,370,366 A | 12/1994 | Ottemann |
| 6,026,692 A | 2/2000 | Brovold |
| 6,659,429 B2 | 12/2003 | Shoji |
| 2004/0041137 A1 | 3/2004 | Shoji |

*Primary Examiner* — Vicky Johnson
(74) *Attorney, Agent, or Firm* — Dority & Manning, P.A.

(57) ABSTRACT

The present invention pertains generally to a self-locking gear that includes an input shaft, a collar, a locking mechanism, and an output member. The collar is positioned eccentrically about the input shaft, and the locking mechanism prevents the collar from rotating. As a result, rotation of the input shaft causes the collar to gyrate about the input shaft, and the gyrating collar engages with the output member to turn the output member in the same direction as the input shaft. Torque applied to the output member with cause the output member to attempt to rotate the collar. However, the locking mechanism prevents the collar from rotating, thus locking the output member from rotation.

20 Claims, 6 Drawing Sheets

SELF-LOCKING GEAR

BACKGROUND OF THE INVENTION

The present invention describes and enables a self-locking gear. The self-locking gear allows the transfer of rotation and torque from an input shaft to an output shaft while preventing the transfer of rotation or torque from the output shaft to the input shaft.

Various devices are known in the art for locking a gear. For example, one of ordinary skill in the art is familiar with the use of a ratchet and pawl to allow an input shaft to transfer rotation and torque in one direction to an output shaft while preventing the output shaft from rotating in the opposite direction. The disadvantage of the ratchet and pawl is that the output shaft can still rotate independently of the input shaft in at least one direction. In addition, the ratchet and pawl prevents the input shaft from transferring torque or rotation to the output shaft in both directions.

One of ordinary skill in the art is also familiar with the operation and characteristics of a worm gear. A worm gear typically includes a screw in threaded engagement with a gear. Rotation of the screw causes a corresponding rotation of the gear. However, the pitch angle between the screw threads and the gear threads prevents the gear from turning the screw.

U.S. Pat. No. 6,659,429 describes a self-locking reduction device that includes an input shaft (11) and a disc (11d) that is eccentrically connected to the input shaft. A metal sleeve (15) surrounds the disc, and the sleeve connects to an internal gear (24) which in turn connects to the output winding drum (17). A series of pins (16) inserted in bores (10) permit the sleeve to gyrate about the input shaft while preventing the sleeve from rotating with respect to the input shaft. During operation, rotation of the input shaft causes the disc to rotate about the input shaft. The eccentric rotation of the disc causes the sleeve to gyrate in the same direction as the disc. The gyrating sleeve causes the internal gear, and thus the output winding drum, to rotate in the same direction as the input shaft. If torque is applied to the output winding drum, the output winding drum will transfer the torque to the internal gear which will attempt to rotate the sleeve. The pins will prevent the sleeve from rotating in either direction, thus locking the internal gear and the output winding drum.

Based on these and other prior art devices, the need exists for an improved self-locking gear that can transfer rotation and torque from an input shaft to an output shaft while preventing the transfer of rotation or torque from the output shaft to the input shaft.

SUMMARY OF THE INVENTION

Objects and advantages of the invention are set forth below in the following description, or may be obvious from the description, or may be learned through practice of the invention.

One embodiment of the present invention is directed to a self-locking gear that includes an input shaft, a collar, an output member, and a locking mechanism. The collar is positioned eccentrically about the input shaft. The output member is engaged with the collar. The locking mechanism is connected to the collar to prevent the collar from rotating. The locking mechanism includes a first plate connected to the collar to allow movement of the collar in a first direction. The locking mechanism also includes a second plate connected to the first plate to allow movement of the collar in a second direction. The first direction is generally perpendicular to the second direction.

Variations of this embodiment may further include a bearing between the first plate and the second plate. In addition, the input shaft may rotate with respect to the collar, and the collar may gyrate about the input shaft. In still further variations, the output member may include a gear or a chain for engagement with the collar.

Another embodiment of the present invention is directed to a self-locking gear that includes an input shaft. A collar is positioned eccentrically about the input shaft, and an output member is engaged with the collar. A first bracket is pivotally connected to the collar; a second bracket is pivotally connected to the first bracket, and a base is pivotally connected to the second bracket. The first and second brackets prevent the collar from rotating.

In particular embodiments, the input shaft may rotate with respect to the collar, and the collar may gyrate about the input shaft. The output member may include a gear or a chain for engagement with the collar. Still further embodiments may include a third bracket pivotally connected to at least one of the first or second brackets, and the pivotal connection between the first and second brackets may generally perpendicular to the pivotal connection between the first bracket and the collar.

Yet another embodiment of the present invention is directed to a self-locking gear that includes an input shaft, a collar positioned eccentrically about the input shaft, and an output member engaged with the collar. A locking mechanism connected to the collar prevents the collar from rotating. Suitable structure for the locking mechanism may include a series of sliding surfaces, pivotally connected joints, or other equivalent structure that prevents the collar from rotating.

In particular variations of this alternate embodiment, the input shaft may rotate with respect to the collar, and the collar may gyrate about the input shaft. In addition, the output member may include gear teeth or a chain for engagement with the collar. Furthermore, the output member may rotate concentrically with the input shaft.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE DISCLOSURE

Figure 1:
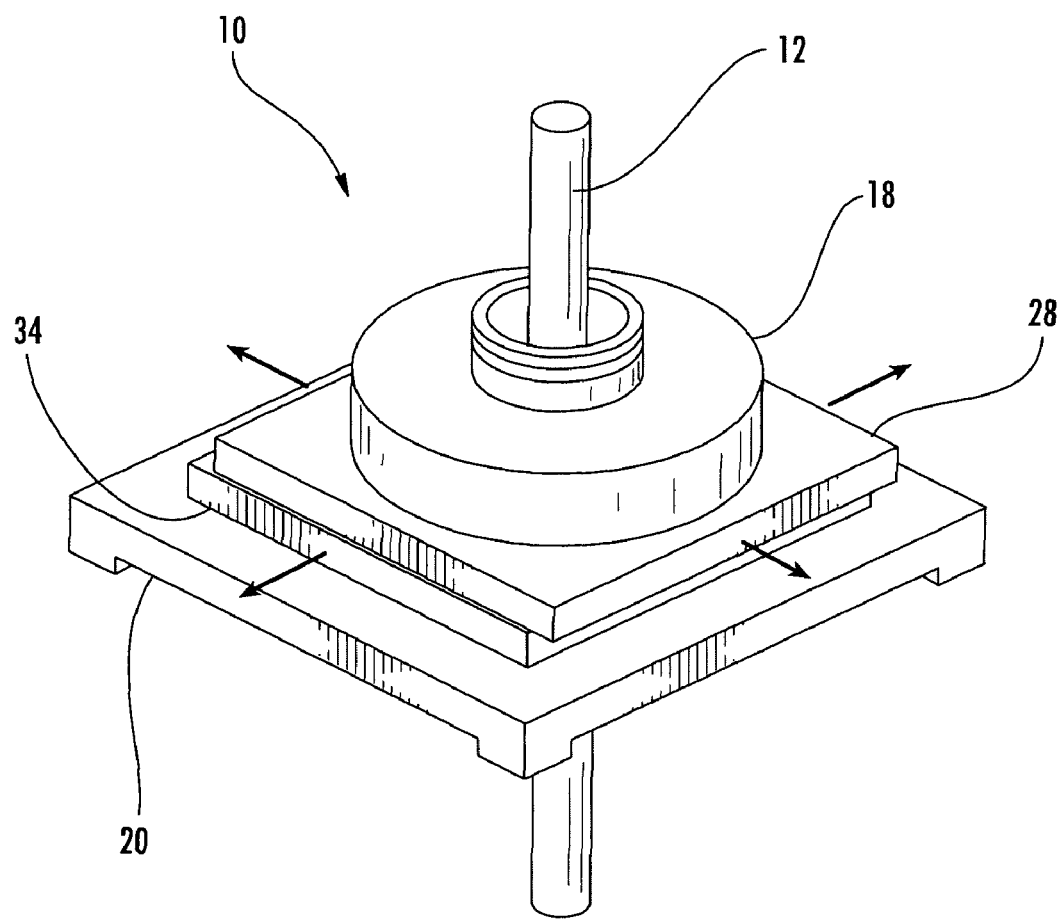
FIG. 1 is a perspective view of one embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

The present invention relates to a self-locking gear. The self-locking gear may be used as a winch, hoist, or other application where it is desirable to transfer torque and rotation from an input shaft to an output shaft while preventing the transfer of torque or rotation from the output shaft to the input shaft.

Figure 2:
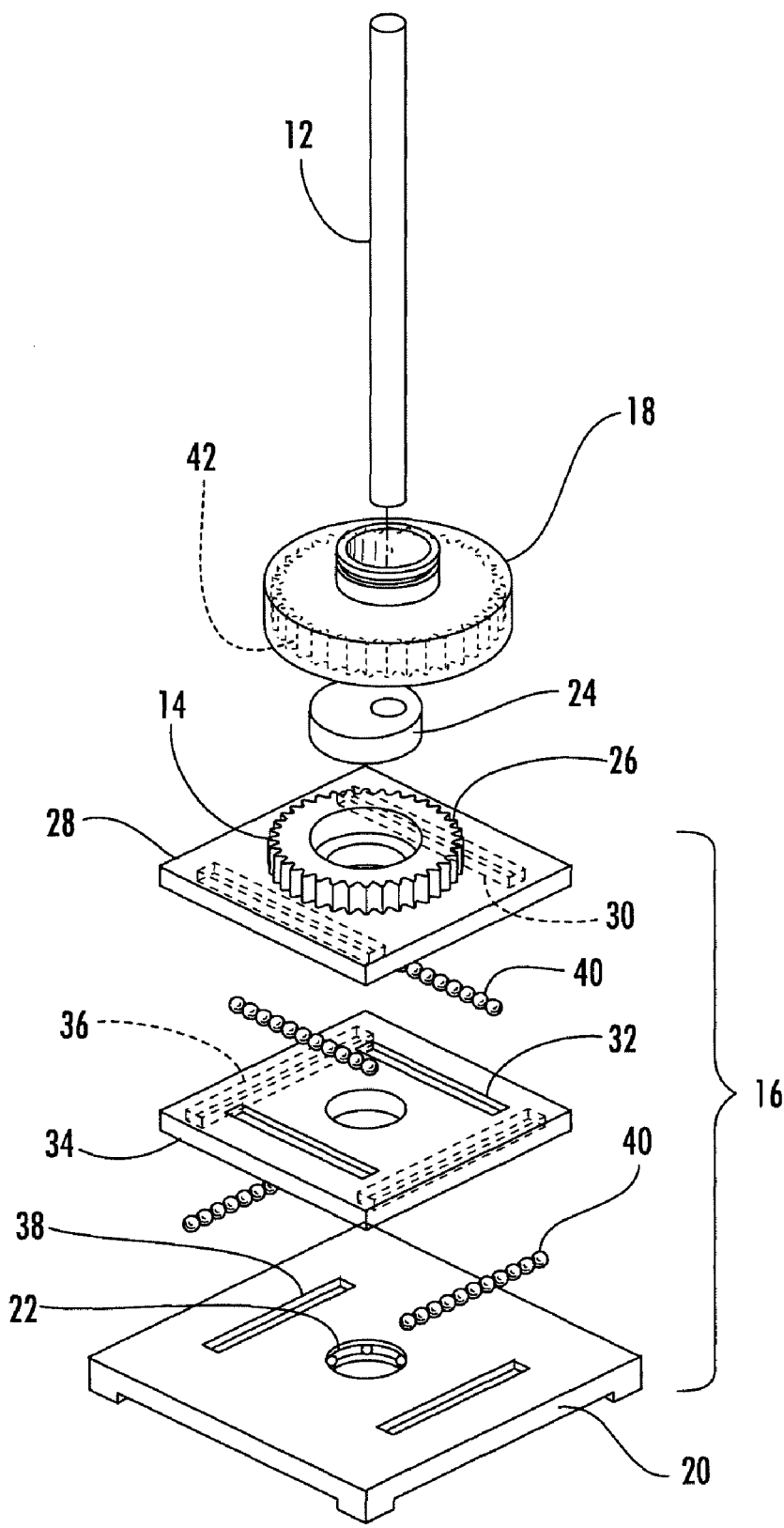
FIG. 2 is an exploded view of the embodiment shown in FIG. 1.
Figure 3:
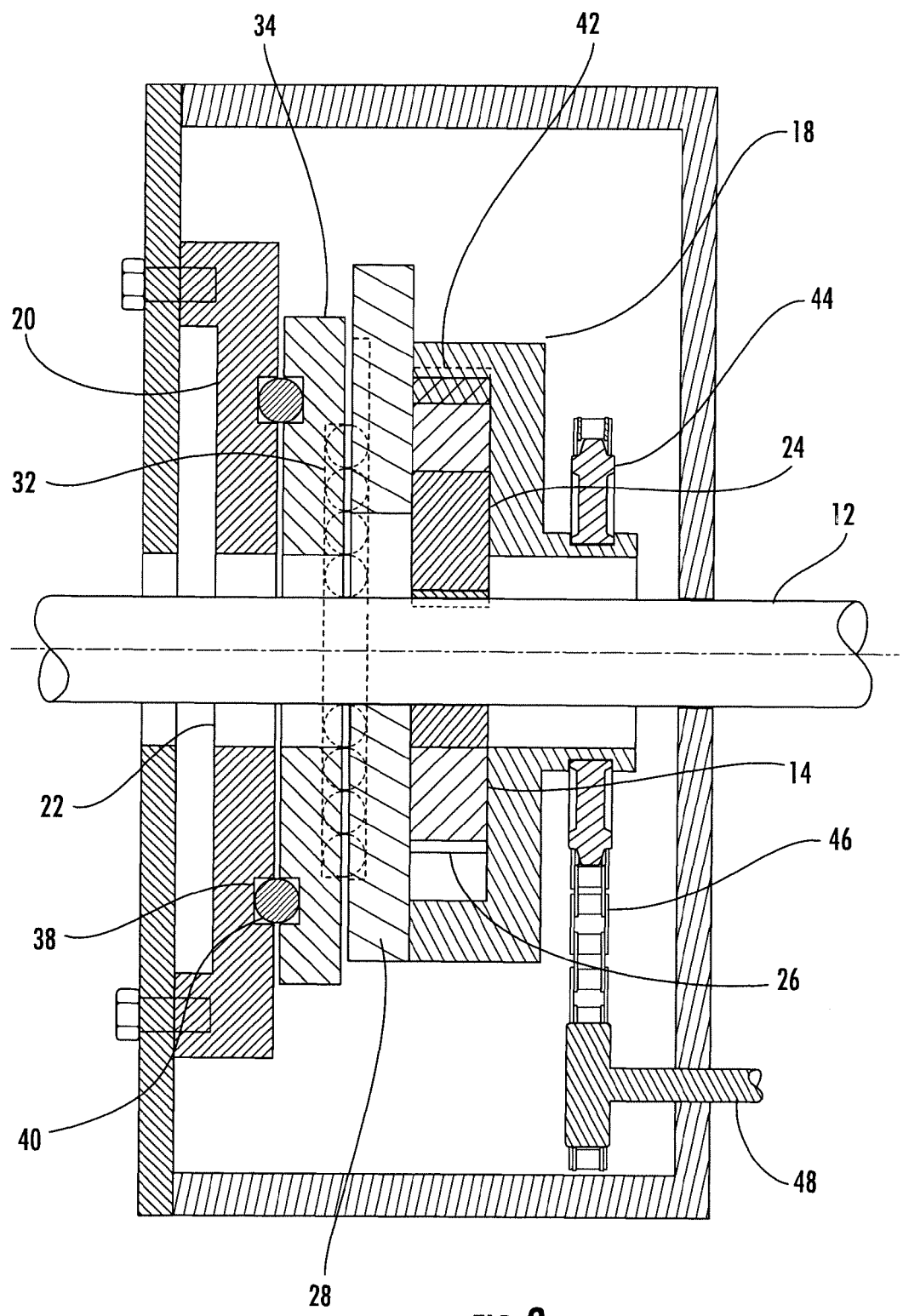
FIG. 3 is a cross-section view of the embodiment shown in FIG. 1 connected to an output shaft.

FIGS. 1, 2, and 3 illustrate a self-locking gear 10 according to one embodiment of the present invention. In this particular embodiment, the self-locking gear 10 includes an input shaft 12, a collar 14, a locking mechanism 16, and an output member 18.

The input shaft 12 may be any structure for receiving torque or rotation. For example, the input shaft 12 may be a cylindrical rod, although any shape may be used for the input shaft 12 within the scope of the present invention. As shown in FIGS. 2 and 3, the input shaft 12 may connect to a base 20, and a bearing 22 between the input shaft 12 and the base 20 allows the input shaft 12 to rotate freely with respect to the base 20.

The collar 14 provides an intermediate connection between the input shaft 12 and the output member 18. The collar 14 is positioned eccentrically around the input shaft 12 so that the geometric center of the collar 14 is not coincident with the geometric center of the input shaft 12. An eccentric disc 24 may be used to position the collar 14 eccentrically around the input shaft 12, as shown in FIGS. 2 and 3. If used, the eccentric disc 24 fixedly attaches to the input shaft 12 so that the eccentric disc 24 rotates in the same direction and speed as the input shaft 12.

The collar 14 is generally circular in shape with a surface configured for engagement with the output member 18. For example, the collar 14 may include gear teeth 26 along the outer perimeter, as shown in FIG. 2. Alternately, the collar 14 may include pins, chain, or other structure suitable for engagement with a complementary surface on the output member 18.

The locking mechanism 16 prevents the collar 14 from rotating in either direction. As shown in FIGS. 2 and 3, the locking mechanism 16 for this particular embodiment may include a series of sliding surfaces that connect the collar 14 to the base 20. For example, a first plate 28 attached to the collar 14 may include a first tongue 30 that slides in a first groove 32 on a second plate 34. The second plate 34 may in turn include a second tongue 36 that slides in a second groove 38 on the base 20. The first groove 32 may be oriented generally perpendicular to the second groove 38. For example, the first groove 32 may be oriented so that the angle between the first groove 32 and the second groove 38 is between 60 degrees and 120 degrees. In addition, bearings 40 may be included between the tongue and groove connections to reduce the friction between the sliding surfaces. In this manner, the locking mechanism 16 allows the collar 14 to slide in any direction in a single plane; however, the locking mechanism 16 prevents the collar 14 from rotating in either direction.

The output member 18 is coaxially aligned with the input shaft 12 and configured for at least partial engagement with the collar 14 as the collar 14 gyrates around the input shaft 12. For example, the output member 18 may include complementary gear teeth 42 that mate with the gear teeth 26 on the collar 14, as shown in FIGS. 2 and 3. In this manner, as the collar 14 gyrates, teeth 26 on the collar 14 engage with teeth 42 of the output member 18 to rotate the output member 18 in the same direction as the gyrating collar 14.

As shown in FIG. 3, a sprocket 44 and chain 46 may connect the output member 18 to an output shaft 48.

The arrangement of the input shaft 12, collar 14, locking mechanism 16, and output member 18 allows the input shaft 12 to transfer torque and rotation to the output member 18. Specifically, rotation of the input shaft 12 causes the eccentric disc 24 to rotate at the same speed and in the same direction as the input shaft 12. The locking mechanism 16 prevents the collar 14 from rotating in either direction, so rotation of the eccentric disc 24 causes the collar 14 to gyrate around the input shaft 12 at the same speed and in the same direction as the input shaft 12. As the collar 14 gyrates around the input shaft 12, the teeth 26 on the collar 14 temporarily engage with teeth 42 of the output member 18 to rotate the output member 18 in the same direction as the input shaft 12.

The arrangement of the input shaft 12, collar 14, locking mechanism 16, and output member 18 also locks the output member 18 to prevent the output member 18 from transferring torque or rotation to the input shaft 12. Specifically, torque and rotation applied to the output member 18 will cause the teeth 42 of the output member 18 engaged with teeth 26 on the collar 14 to try to rotate the collar 14. However, as previously described, the locking mechanism 16 prevents the collar 14 from rotating in either direction, thus locking the output member 18 from any rotation.

Figure 4:
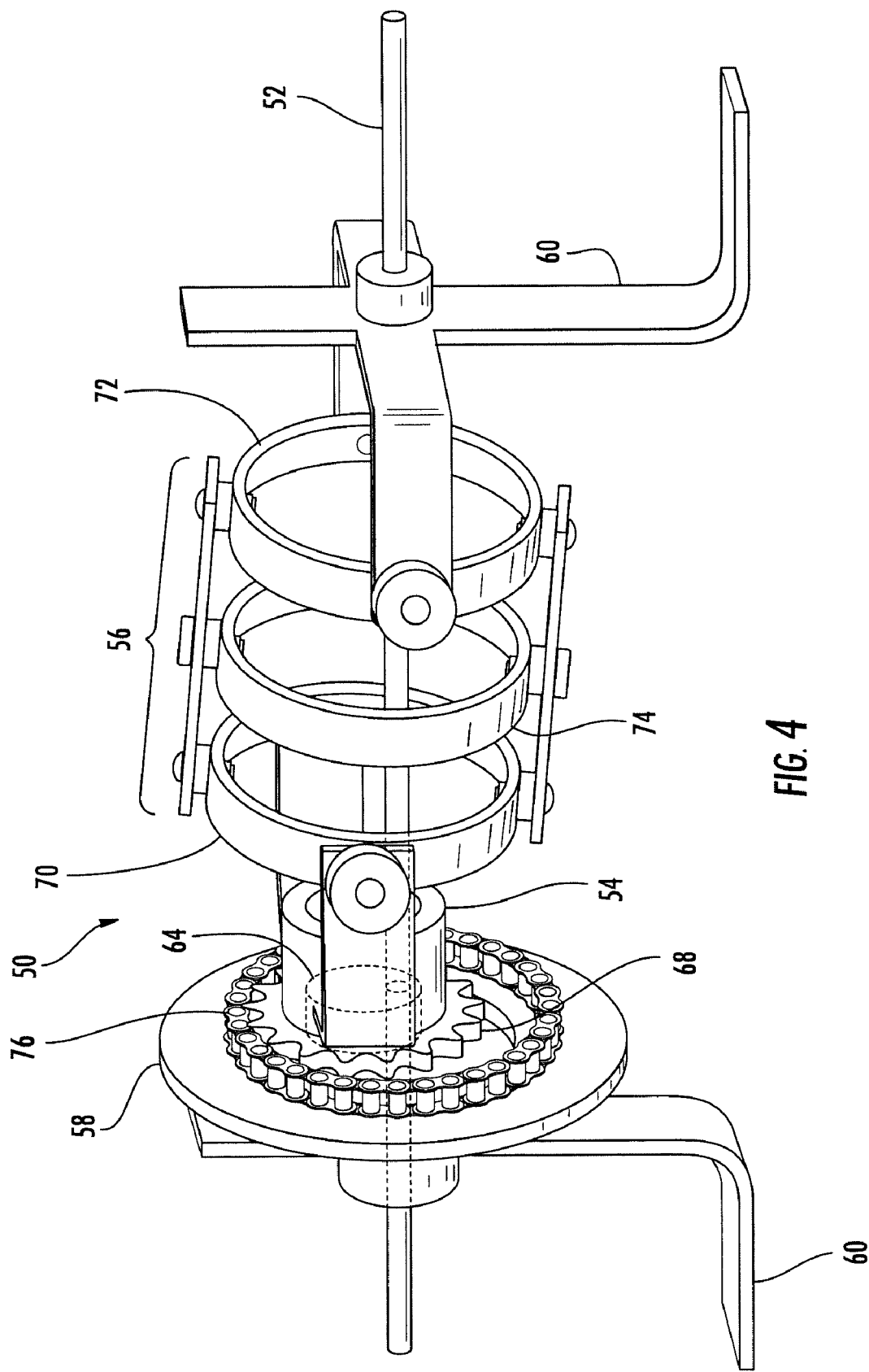
FIG. 4 is a perspective view of an alternate embodiment of the present invention.
Figure 5:
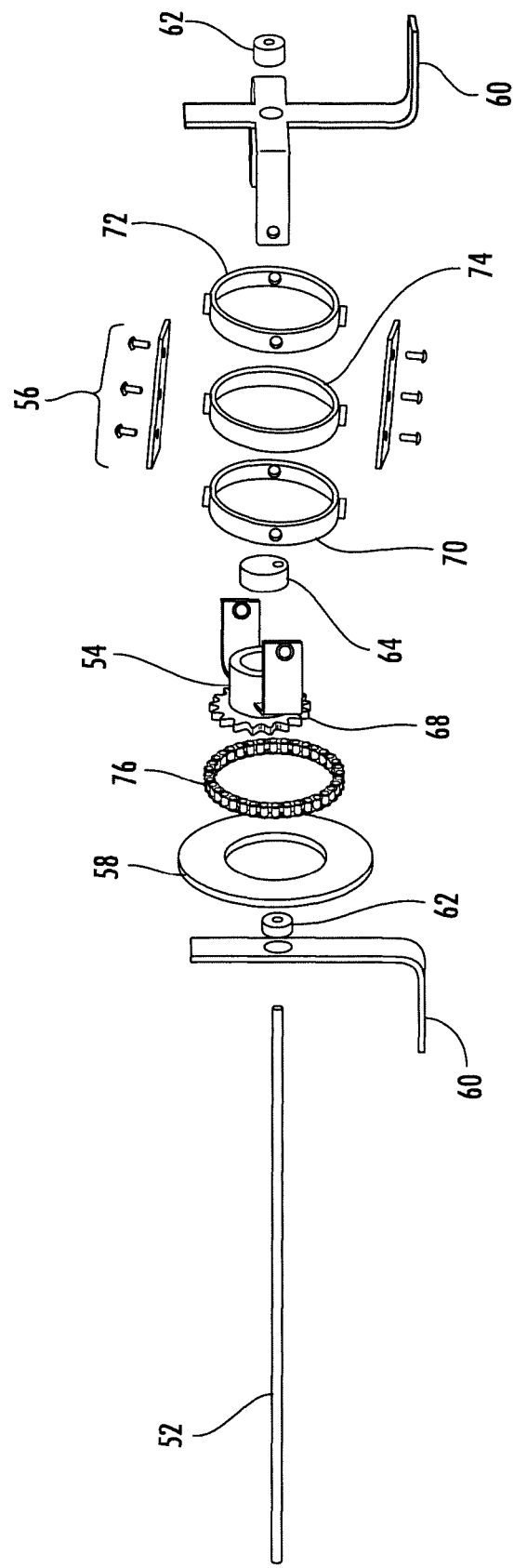
FIG. 5 is an exploded view of the embodiment shown in FIG. 4.
Figure 6:
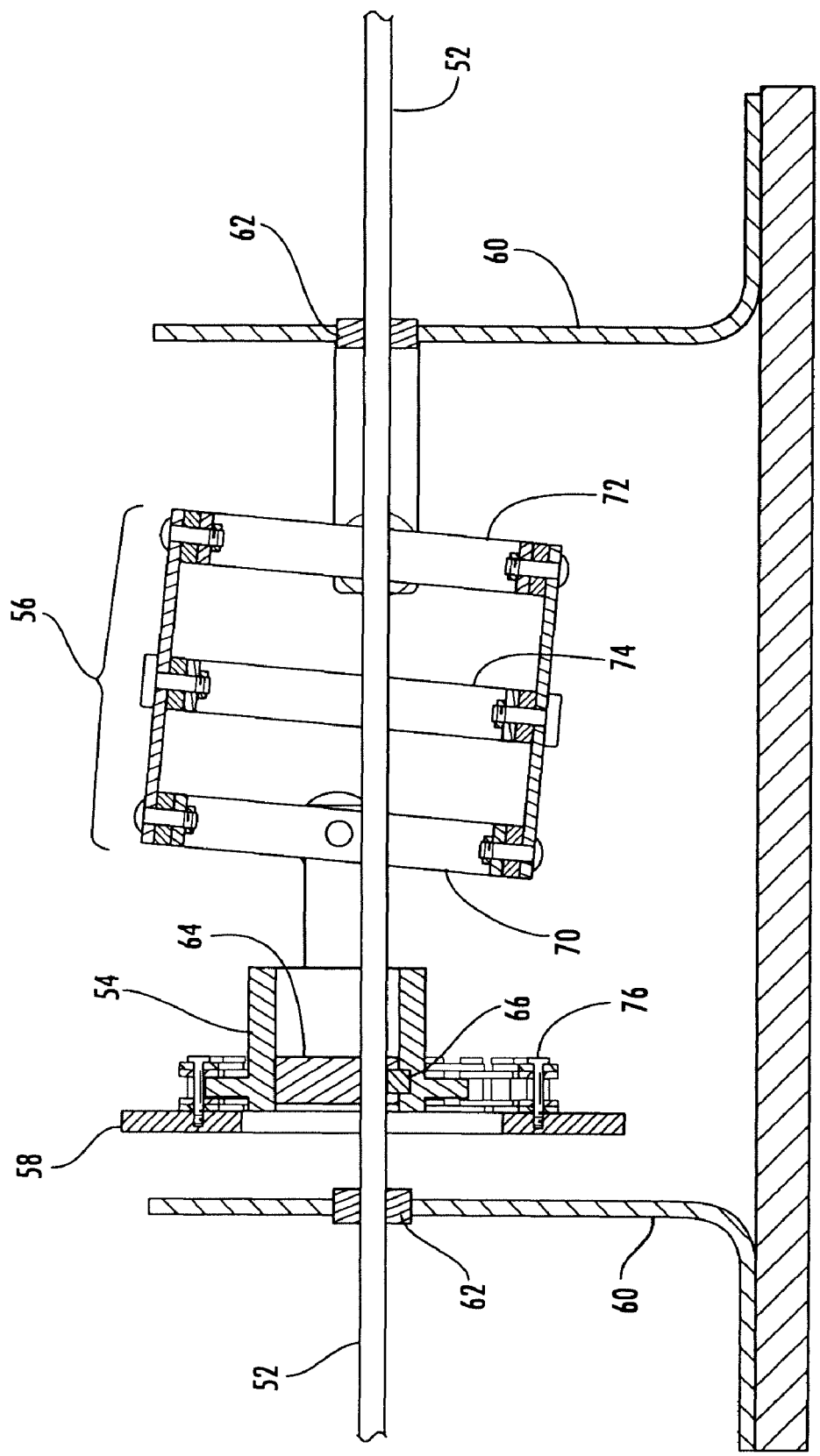
FIG. 6 is a cross-section view of the embodiment shown in FIG. 4.

FIGS. 4, 5, and 6 illustrate a self-locking gear 50 according to an alternate embodiment of the present invention. In this particular embodiment, the self-locking gear 50 again includes an input shaft 52, a collar 54, a locking mechanism 56, and an output member 58.

As with the previously described embodiment, the input shaft 52 may be any structure for receiving torque or rotation. As shown in FIGS. 4, 5, and 6, the input shaft 52 may connect to a base 60, and a bearing 62 between the input shaft 52 and the base 60 allows the input shaft 52 to rotate freely with respect to the base 60.

The collar 54 again provides an intermediate connection between the input shaft 52 and the output member 58. The collar 54 is positioned eccentrically around the input shaft 52 so that the geometric center of the collar 54 is not coincident with the geometric center of the input shaft 52. An eccentric disc 64 may be used to position the collar 54 eccentrically around the input shaft 52, as shown in FIGS. 4 and 6. If used, the eccentric disc 64 fixedly attaches to the input shaft 52, such as with a key 66, so that the eccentric disc 64 rotates in the same direction and speed as the input shaft 52.

The collar 54 is generally circular in shape with a surface configured for engagement with the output member 58. For example, the collar 54 may include gear teeth 68 along the outer perimeter, as shown in FIGS. 4 and 5. Alternately, the collar 54 may include pins, chain, or other structure suitable for engagement with a complementary surface on the output member 58.

The locking mechanism 56 prevents the collar 54 from rotating in either direction. As shown in FIGS. 4, 5, and 6, the locking mechanism 56 for this particular embodiment may include a series of pivotal connections between the collar 54 and the base 60. For example, the collar 54 may pivotally connect to a first bracket 70; the first bracket 70 may pivotally connect to a second bracket 72, and the second bracket 72 may pivotally connect to the base 60. The pivotal connection between the first and second brackets 70, 72 may be oriented generally perpendicular to the pivotal connection between the first bracket 70 and the collar 54. For example, the pivotal connection between the first and second brackets 70, 72 may be oriented so that the angle between this connection and the pivotal connection between the first bracket 70 and the collar 54 is between 60 degrees and 120 degrees. If desired, the locking mechanism 56 may include additional pivotally connected brackets 74 to increase the strength of the locking mechanism 56. In this manner, the locking mechanism 56 allows the collar 54 to slide in any direction in a single plane; however, the locking mechanism 56 prevents the collar 54 from rotating in either direction.

The output member 58 is coaxially aligned with the input shaft 52 and configured for at least partial engagement with the collar 54 as the collar 54 gyrates around the input shaft 52. For example, the output member 58 may include a chain 76 that mates with the gear teeth 68 on the collar 54, as shown in FIG. 4. In this manner, as the collar 54 gyrates, teeth 68 on the collar 54 engage with portions of the chain 76 on the output member 58 to rotate the output member 58 in the same direction as the gyrating collar 54.

The arrangement of the input shaft 52, collar 54, locking mechanism 56, and output member 58 again allows the input shaft 52 to transfer torque and rotation to the output member 58. Specifically, rotation of the input shaft 52 causes the eccentric disc 64 to rotate at the same speed and in the same direction as the input shaft 52. The locking mechanism 56 prevents the collar 54 from rotating in either direction, so rotation of the eccentric disc 64 causes the collar 54 to gyrate around the input shaft 52 at the same speed and in the same direction as the input shaft 52. As the collar 54 gyrates around the input shaft 52, the teeth 68 on the collar 54 temporarily engage with portions of the chain 76 of the output member 58 to rotate the output member 58 in the same direction as the input shaft 52.

The arrangement of the input shaft 52, collar 54, locking mechanism 56, and output member 58 also locks the output member 58 to prevent the output member 58 from transferring torque or rotation to the input shaft 52. Specifically, torque and rotation applied to the output member 58 will cause the portions of the chain 76 of the output member 58 engaged with teeth 68 on the collar 54 to try to rotate the collar 54. However, as previously described, the locking mechanism 56 prevents the collar 54 from rotating in either direction, thus locking the output member 58 from any rotation.

It should be appreciated by those skilled in the art that modifications and variations can be made to the embodiments of the invention set forth herein without departing from the scope and spirit of the invention as set forth in the appended claims and their equivalents.

What is claimed is:
1. A self-locking gear comprising:
   a. an input shaft;
   b. a collar positioned eccentrically about said input shaft;
   c. an output member engaged with said collar;
   d. a first bracket pivotally connected to said collar;
   e. a second bracket pivotally connected to said first bracket;
   f. a base pivotally connected to said second bracket;
   g. wherein said first and second brackets prevent said collar from rotating.
2. The self-locking gear of claim 1, wherein said input shaft rotates with respect to said collar.
3. The self-locking gear of claim 1, wherein said collar gyrates about said input shaft.
4. The self-locking gear of claim 1, wherein said output member includes a gear for engagement with said collar.
5. The self-locking gear of claim 1, wherein said output member includes a chain for engagement with said collar.
6. The self-locking gear of claim 1, further including a third bracket pivotally connected to at least one of said first or second brackets.
7. The self-locking gear of claim 1, wherein said pivotal connection between said first and second brackets is generally perpendicular to said pivotal connection between said first bracket and said collar.
8. The self-locking gear of claim 1, wherein said output member rotates concentrically with said input shaft.
9. A self-locking gear comprising:
   a. an input shaft;
   b. a collar positioned eccentrically about said input shaft, wherein said collar gyrates about said input shaft;
   c. an output member engaged with said collar; and
   d. a locking mechanism connected to said collar that prevents said collar from rotating in either direction.
10. The self-locking gear of claim 9, wherein said locking mechanism includes
    a. a first bracket pivotally connected to said collar;
    b. a second bracket pivotally connected to said first bracket; and
    c. a base pivotally connected to said second bracket.
11. The self-locking gear of claim 9, wherein said input shaft rotates with respect to said collar.
12. The self-locking gear of claim 9, wherein said output member includes gear teeth for engagement with said collar.
13. The self-locking gear of claim 9, wherein said output member includes a chain for engagement with said collar.
14. The self-locking gear of claim 9, wherein said output member rotates concentrically with said input shaft.
15. A self-locking gear comprising:
   a. an input shaft;
   b. a collar positioned eccentrically about said input shaft;
   c. an output member engaged with said collar, wherein said output member includes a chain for engagement with said collar; and
   d. a locking mechanism connected to said collar that prevents said collar from rotating in either direction.
16. The self-locking gear of claim 15, wherein said locking mechanism includes
    a. a first bracket pivotally connected to said collar;
    b. a second bracket pivotally connected to said first bracket; and
    c. a base pivotally connected to said second bracket.
17. The self-locking gear of claim 15, wherein said input shaft rotates with respect to said collar.
18. The self-locking gear of claim 15, wherein said collar gyrates about said input shaft.
19. The self-locking gear of claim 15, wherein said output member includes gear teeth for engagement with said collar.
20. The self-locking gear of claim 15, wherein said output member rotates concentrically with said input shaft.

* * * * *